US007021056B2

(12) United States Patent
Watanabe et al.

(10) Patent No.: US 7,021,056 B2
(45) Date of Patent: Apr. 4, 2006

(54) EXHAUST HEAT RECOVERY SYSTEM

(75) Inventors: Kenji Watanabe, Yokohama (JP); Tomonari Ito, Chiba (JP)

(73) Assignee: Tokyo Electric Power Company, Tokyo (JP)

( * ) Notice: Subject to any disclaimer, the term of this patent is extended or adjusted under 35 U.S.C. 154(b) by 0 days.

(21) Appl. No.: 10/467,027

(22) PCT Filed: Nov. 29, 2002

(86) PCT No.: PCT/JP02/12539

§ 371 (c)(1),
(2), (4) Date: Aug. 1, 2003

(87) PCT Pub. No.: WO03/048651

PCT Pub. Date: Jun. 12, 2003

(65) Prior Publication Data

US 2004/0068989 A1 Apr. 15, 2004

(30) Foreign Application Priority Data

Dec. 3, 2001 (JP) ............................ 2001-369357

(51) Int. Cl.
*F02G 1/00* (2006.01)

(52) U.S. Cl. .......................................... 60/597; 60/685

(58) Field of Classification Search .................. 60/597, 60/685, 39.182

See application file for complete search history.

(56) References Cited

U.S. PATENT DOCUMENTS 3,678,284 A * 7/1972 Peters ........................ 290/1 R
3,979,913 A 9/1976 Yates .......................... 60/618
4,976,100 A * 12/1990 Lee ............................ 60/772
5,241,817 A * 9/1993 George, Jr. .............. 60/39.182
5,419,284 A * 5/1995 Kobayashi et al. ......... 122/7 B
5,719,990 A 2/1998 Yang .......................... 392/400

FOREIGN PATENT DOCUMENTS

| | | |
|---|---|---|
| GB | 2092724 | 8/1982 |
| JP | 58135334 | 9/1983 |
| JP | 3052545 | 5/1991 |
| JP | 4090450 | 3/1992 |
| JP | 603227 | 1/1994 |
| JP | 6300362 | 10/1994 |
| JP | 801408 | 1/1996 |
| JP | 8086509 | 4/1996 |
| JP | 10186609 | 7/1998 |
| JP | 22274 | 1/2002 |
| JP | 2115907 | 4/2002 |

OTHER PUBLICATIONS

European Search Report dated Oct. 22, 2004.

* cited by examiner

*Primary Examiner*—Hoang Nguyen
(74) *Attorney, Agent, or Firm*—Baker Botts LLP

(57) ABSTRACT

The present invention relates to an exhaust heat recovery system that recovers exhaust heat that is generated by an electrical power generator for use in supplying hot water and air conditioning, and has as an object of providing an exhaust heat recovery system that realizes reduced costs and has a high energy efficiency. The exhaust heat recovery system provides a heat exchanger HEX1 for exhaust heat recovery that heats heating medium by heat exchange between exhaust gas generated at the power generator and heating medium that is circulated and used in a predetermined facility. In addition, the exhaust heat recovery system comprises a tank 13 that temporarily stores the heating medium, and an open-air pipe 41 that releases the contents of the tank 13.

7 Claims, 13 Drawing Sheets

EXHAUST HEAT RECOVERY SYSTEM

TECHNICAL FIELD

The present invention relates to an exhaust heat recovery system that recovers exhaust heat that is generated by an electrical power generator for use in supplying hot water and air conditioning.

The present application is based on Japanese Patent Application, No. 2001-369357, the contents of which are incorporated herein by reference.

BACKGROUND ART

In recent years, in relatively small-scale areas such as office buildings, industrial facilities, and the like, electrical power generators are driven by using drive sources which use gas, oil, or the like, as a fuel, and there is a trend to use systems that self-contained electrical energy. In particular, as a drive source for an electrical power generator, the technology used in small-scale gas turbines that are driven using low cost fuel and have a low noise level has been progressing, its flexibility has been increasing, and thus there is a trend to expand the use of these.

There are many cases in which self-contained electrical power systems such as these have an exhaust heat recovery system attached in which exhaust heat generated by the drive source when driving an electrical power generator is recovered, and is used for supplying hot water and air conditioning within the area.

FIG. 13 shows an example of an exhaust heat recovery system. In FIG. 13, reference numeral 501 is a gas turbine, 502 is a heat exchanger for exhaust heat recovery, 503 is a hot water storage tank, 504 is a hot water supply column, 505 is a water supply tank, 506 is a heat exchanger for hot water supply temperature adjustment, and 507 is a cooling tower. The gas turbine 501 and the heat exchanger 502 for exhaust heat recovery are connected by an exhaust gas feed pipe 508, and furthermore, an exhaust tower 509, which discharges the exhaust gas that has heated water, is provided in the heat exchanger 502 for exhaust heat recovery.

The heat exchanger 502 for exhaust heat recovery and the hot water storage tank 503 are connected by a primary pipe 510 that forms a closed cycle system in which the water (hot water) is circulated. In addition, the storage tank 503, the hot water supply column 504, and the heat exchanger 506 for hot water supply temperature adjustment are connected by a secondary pipe 511 that forms a closed cycle system in which hot water is circulated. The water supply tank 505 is connected to the secondary pipe 511 by a water supply pipe 512. Furthermore, the heat exchanger 506 for hot water supply temperature adjustment and the cooling tower 507 are connected by a coolant pipe 513 that forms a closed cycle system in which water is circulated as a coolant.

In the exhaust heat recovery system described above, the exhaust heat of the gas turbine 501 is fed into the heat exchanger 502 for exhaust heat recovery, then is discharged to the hot water storage tank 503, then heat exchange with the water circulating in the primary pipe 510 is carried out, and thereby the water is heated. The water (hot water) heated in the heat exchanger 502 for exhaust heat recovery flows into the hot water storage tank 503. The water (hot water) from the hot water storage tank 503 is circulated in the secondary pipe 511, and when the hot water supply column 504 is opened, the water flows outside the system and is used. When the remaining amount of water (hot water) in the hot water storage tank 503 becomes small, an appropriate amount of water is supplied from the water supply tank 505.

In addition, in the exhaust heat recovery system described above, when the use of water (hot water) that circulates through the secondary pipes 511 is low, the temperature of water (hot water) in the system rises excessively. Thus, in this case, in the heat exchanger 506 for hot water supply temperature adjustment, excess heat energy is recovered and discharged into the atmosphere by the cooling tower 507.

In the exhaust heat recovery system described above, there are problems in that the cooling facility formed by the heat exchanger 506 for hot water supply temperature adjustment and the cooling tower 507 are necessary, and thereby the system as a whole becomes complicated and large, and the costs for the installation easily increase.

In addition, accompanying the expansion of use of the self-contained type power supply systems, exhaust heat recovery systems having high energy efficiency are required.

DISCLOSURE OF INVENTION

In consideration of the circumstances described above, it is an object of the present invention to provide an exhaust heat recovery system that can realize lower cost, and further, that provides high energy efficiency.

In order to attain these objects, the present invention is an exhaust heat recovery system having a heat exchanger for exhaust heat recovery that heats a heating medium by carrying out heat exchange between an exhaust gas generated by an electrical power generator and the heating medium that is circulated and used, comprising: a tank that temporarily stores the heating medium, and an open-air pipe that releases the contents of the tank.

In the exhaust heat recovery system, a thermal storage effect can be produced by the heat medium stored in the tank, so the temperature fluctuation of the heating medium is moderated. Also, because this tank is an open-air type tank, a pressure rise in the heating medium does not occur easily, and the temperature of the heating medium can be easily raised. Furthermore, because the tank is an open-air type tank, bubbles and steam generated in the heating medium can be separated and discharged in the tank, and thus problems due to bubbles and steam in the liquid can be avoided, and thereby it is possible to treat the heating medium at a temperature near the boiling point. Specifically, in this exhaust heat recovery system, the heating medium is heated to a temperature near the boiling point, and this high temperature state can be stably maintained. In addition, because the tank is an open-air type, the use of a high-cost pressure-resistant structure can be avoided, and a cost reduction can be realized.

In the exhaust heat recovery system, it is better to dispose the tank lower than the heat exchanger for exhaust heat recovery.

In the exhaust heat recovery system, by disposing the tank lower than the heat exchanger for exhaust heat recovery, the heating medium inside piping lines including the heat exchanger for exhaust heat recovery can easily returns to the tank. Therefore, for example, if the heating medium experiences abnormal boiling, it is possible to return the heating medium to the tank, and make it settle. In addition, during long periods of stopped operation, and the like, by returning the heating medium inside piping lines including the heat exchanger for exhaust heat recovery to the tank and keeping them in a dry condition, the corrosion can be minimized.

In addition, in the exhaust heat recovery system, it is better to connect one end of the open-air pipe to the tank, and to connect the other end to a flow path of the exhaust gas.

In the exhaust heat recovery system, one end of the open-air pipe is connected to the tank, and the other end is connected to the flow path of the exhaust gas, thus the inside of the tank can be opened to the atmosphere reliably. In addition, by connecting the other end of the open-air type pipe to the flow path of the exhaust gas, if a steam of the heating medium is sprayed, dispersion to the outside can be prevented.

In addition, in the exhaust heat recovery system, it is better to provide a condenser that condenses steam of the heating medium that is evaporated from the tank in the open-air pipe.

In the exhaust heat recovery system, because the condenser is provided in the open-air pipe, the steam of the heating medium that evaporates from the tank is condensed, and returns to the tank. Thereby, a decrease in the volume of the heating medium can be limited.

In this case, it is better to dispose the condenser so that a flow path on the atmosphere side is higher than a flow path on the tank side.

By disposing the condenser with the flow path on the atmosphere side being higher than on the tank side, the steam of the heating medium condensed in the condenser returns to the tank without fail.

In addition, in the exhaust heat recovery system, it is better that a lid including an insulation material floats on the heating medium in the tank.

In the exhaust heat recovery system, by means of the lid including insulation material floating on the heating medium in the tank, a heat maintaining effect is attained, and thereby even though the tank is open to the air, the amount of heat energy that escapes into the atmosphere is limited, and the heat energy recovered from the exhaust heat can be used without loss.

In this case, at the upper face of the lid, it is better to provide a block-preventing part that prevents blocking of the open-air pipe accompanying the movement of the lid.

By providing the block-preventing part at the upper face of the lid, even when the lid moves along with the movement of the water surface inside the tank, blocking of the open-air pipe can be prevented.

In addition, at the under face of the lid, it is better to provide an overturn-preventing part which prevents overturn and reverse of the lid.

By providing the overturn-preventing part, even when the lid moves along with the movement of the water surface inside the tank, the reverse and overturn of the lid is prevented, and the heat maintaining effect of the lid is maintained.

In addition, it is better to provide a gap between the internal wall of the tank and the lid to limit the rough movement of the lid accompanying a steam release of said heating medium.

By providing a gap between the internal wall and the lid, rough movement of the lid accompanying the steam release of the heating medium is limited, and the heat maintaining effect by the lid is stably maintained.

BEST MODE FOR CARRYING OUT THE INVENTION

The embodiments of the exhaust heat recovery system of the present invention will be explained below with reference to the figures.

Figure 1:
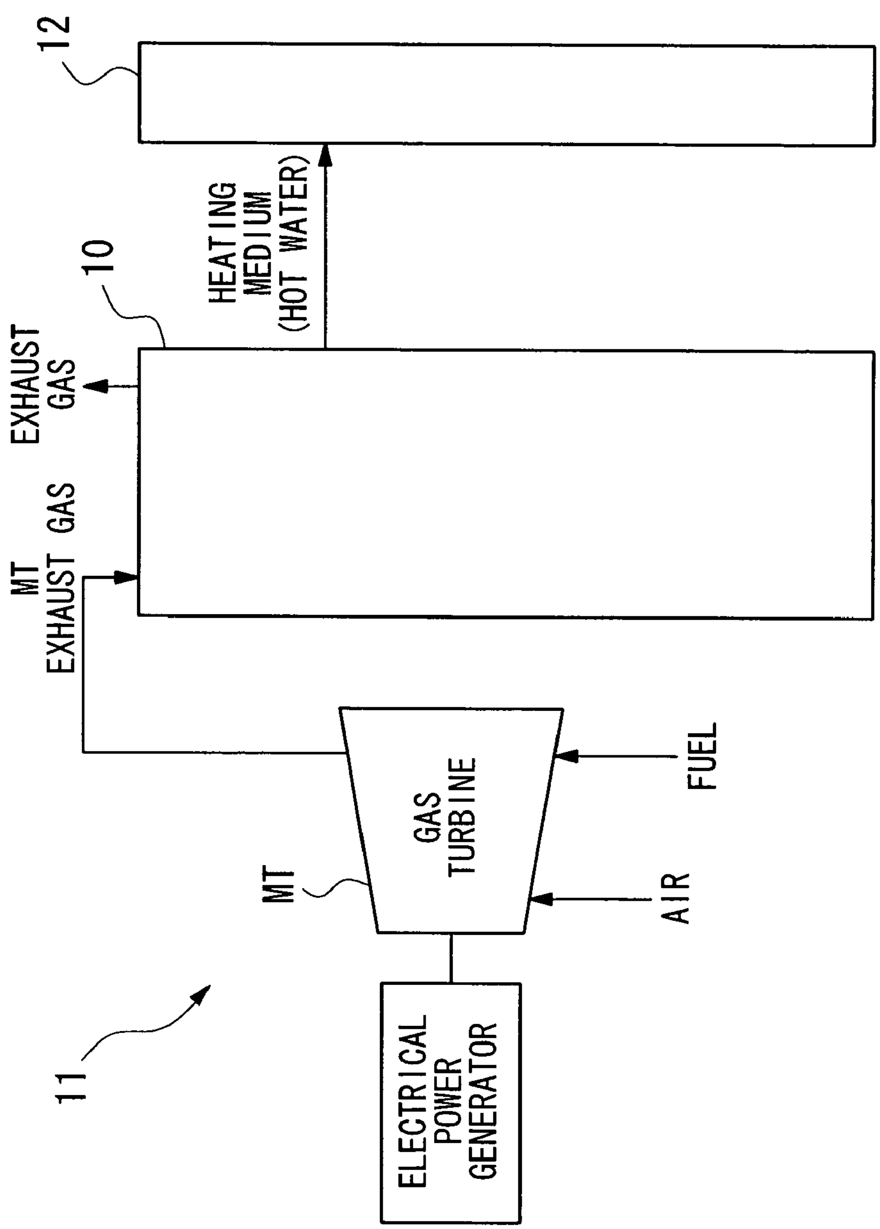
FIG. 1 is a drawing showing a schematic example of the entire structure of the self-contained type electrical power supply system to which the exhaust heat recovery system of the present invention is attached.

FIG. 1 schematically shows the entire structure of the self-contained type electrical power supply system 11 into which the exhaust heat recovery system 10 has been incorporated. The self-contained type electrical power supply system 11 itself obtains electrical power by driving an electrical power generator using a small sized gas turbine (micro gas turbine) MT as a drive source, while the exhaust heat recovery system 10 that is attached thereto captures the heat of the exhaust gas generated by the gas turbine MT when driving the electrical power generator, and this is used in predetermined facilities 12 such as air conditioning and hot water supply.

Figure 2:
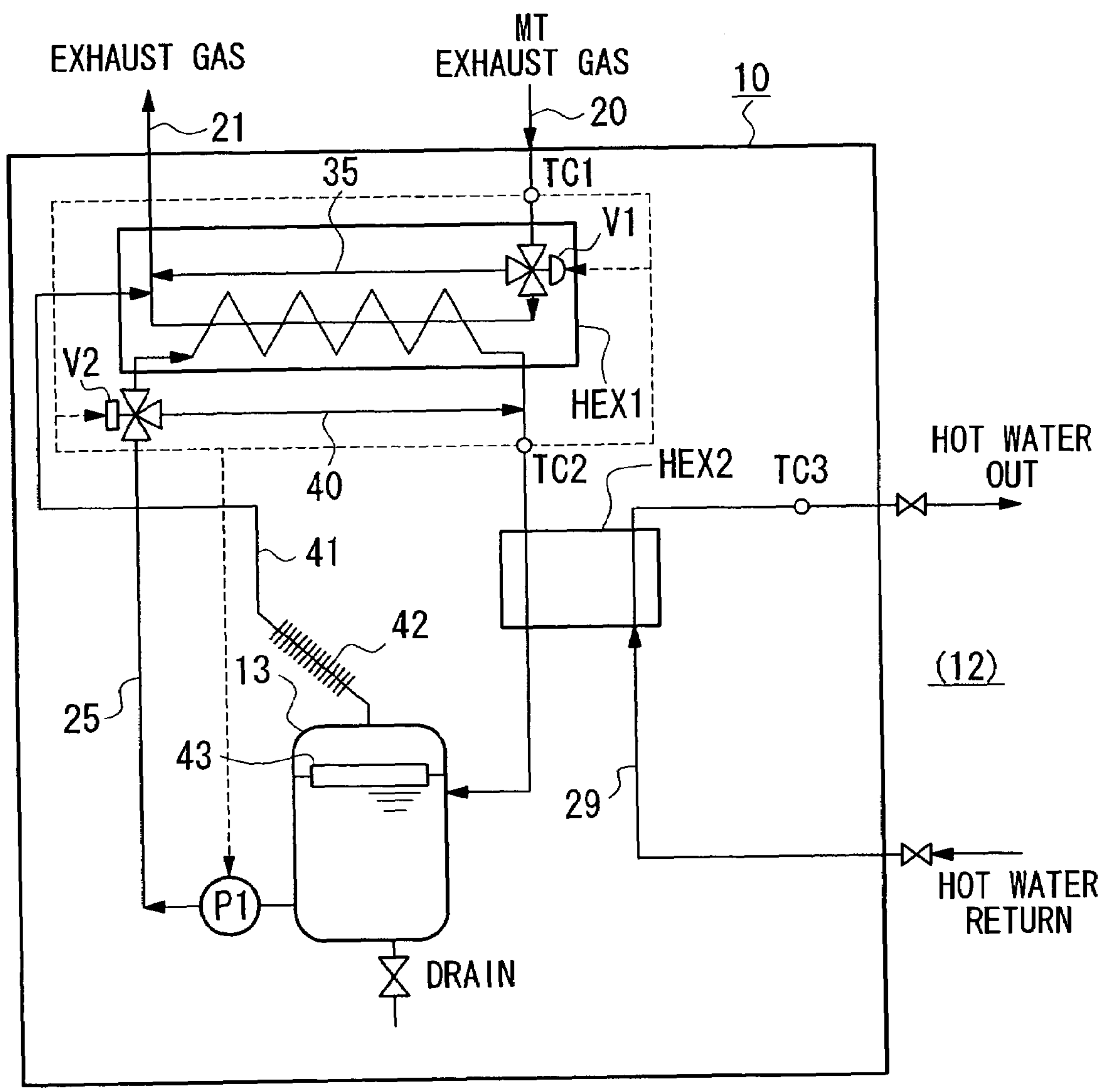
FIG. 2 is a drawing showing the structure of the first embodiment of the exhaust heat recovery system of the present invention.

FIG. 2 is a drawing showing the structure of the embodiment of the exhaust heat recovery system 10. In the exhaust heat recovery system 10 of the present embodiment, the water (hot water) used and circulated is heated by using the heat of the exhaust gas generated in an electric power generator. As a facility 12 (a facility that uses hot water) that circulates and uses the hot water, for example, a floor heating apparatus, an absorption type water heater/cooler, and the like can be given as examples of air conditioning apparatuses that use heat. Furthermore, an indirect heat exchanger as the predetermined facility 12 can be used for various kinds of heating, including for drinkable hot water.

In FIG. 2, HEX1 is a heat exchanger for exhaust heat recovery that heats a heating medium by carrying out heat exchange between exhaust gas and the heating medium. Reference numeral 13 is a heat storage tank acting as a buffer tank that temporarily stores the heating medium that has been heated by the heat exchanger HEX1 for exhaust heat recovery. HEX2 denotes a heat exchanger for heating water that heats water by carrying out heat exchange between the heated heating medium and the water (hot water). P1 is a pump for conveying the heating medium. Moreover, water (hot water) or chemicals can be used as a heating medium.

The gas turbine MT (refer to FIG. 1) and the heat exchanger HEX1 for exhaust heat recovery are connected by exhaust gas feed pipe 20. A temperature sensor TC1 that detects the temperature of the exhaust gas is provided on the exhaust gas feed pipe 20 immediately in front of the location where the exhaust gas is fed into the heat exchanger HEX1 for exhaust heat recovery. In addition, an exhaust tower 21 that discharges the exhaust gas to the outside is provided on the heat exchanger HEX1 for exhaust heat recovery.

The heat exchanger HEX1 for exhaust heat recovery, the heat storage tank 13, and the pump P1 are connected by a primary heating medium pipe 25 that forms the primary heating medium circulation system that circulates the heating medium. In addition, the heat exchanger HEX2 for heating water is a plate-type heat exchanger, and is connected to the heat storage tank 13 and a hot water pipe 29 for hot water circulation. Moreover, the supply pressure of the hot water in the hot water pipe 29 is provided by the facility 12 side that circulates and uses hot water.

Figure 3:
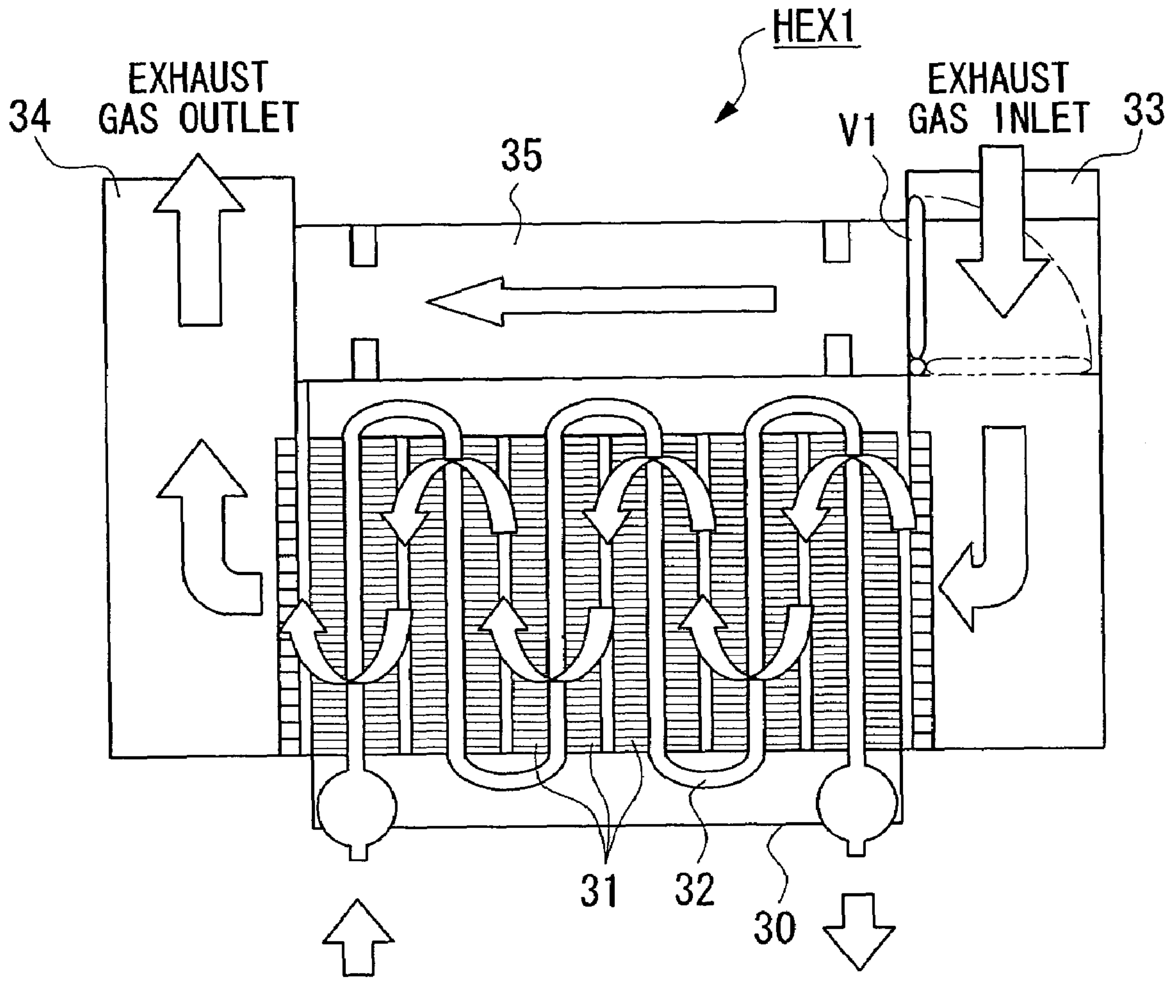
FIG. 3 is a drawing schematically showing the internal structure of a heat exchanger for exhaust heat recovery.

FIG. 3 schematically shows the structure of the heat exchanger HEX1 for exhaust heat recovery.

The heat exchanger HEX1 for exhaust heat recovery accommodates a stainless steel bending heat exchanger tube 32 having installed thereon a plurality of aluminum cooling fins 31 inside a body case 30. In the upper part of the body case 30, an inlet 33 and an outlet 34 for the exhaust gas are provided such that they are separated from each other. The exhaust gas feed pipe 20 described above (refer to FIG. 2) is connected to the inlet 33, and the exhaust gas tower 21 described above (refer to FIG. 2) is connected to the outlet 34. In addition, the heat exchanger tube 32 forms a part of the primary heating medium conveyance system by connecting to the heating medium pipe 25 (refer to FIG. 2) described above.

A control valve V1 is provided on the heat exchanger HEX1 for exhaust heat recovery that guides the exhaust gas fed through the exhaust gas feed pipe 20 to the exhaust gas tower 21 before it is fed into the heat exchanger HEX1 for exhaust heat recovery, and discharges it into the atmosphere. A bypass flow path 35 is provided between the control valve V1 and the exhaust gas tower 21 that diverts a portion of the exhaust gas to be fed into the heat exchanger HEX1 for exhaust heat recovery. The control valve V1 includes a butterfly valve that closes off a portion or all of the inlet 33 and the bypass flow path 35, and a driving apparatus (not illustrated) such as an electric motor that drives the butterfly valve and oscillates between the adjacent inlet 33 and the entrance to the bypass flow path 35.

Next, in this example, in the heat exchanger HEX1 for exhaust heat recovery, there is what is termed a counter-flow, in which the direction of the flow of the heating medium in the heat exchanger tube 32 and the direction of the flow of the exhaust gas flowing along the outside of the heat exchanger tube 32 are in opposite directions. A counter-flow type heat exchanger, in which the two fluids undergoing heat exchange flow in opposite directions, has a high efficiency, and can easily realize uniform heat exchange. However, the present invention is not limited to a counter-flow type heat exchanger, and a parallel-flow type heat exchanger, in which the direction of the flow of the heating medium and the direction of the flow of the exhaust gas are the same, can be used.

Returning to FIG. 2, a three-way selector valve V2 and a bypass pipe 40 that divert heating medium to be fed into the heat exchanger HEX1 for exhaust heat recovery to the outlet side of the heat exchanger HEX1 for exhaust heat recovery are provided on the primary heating medium pipe 25.

A temperature sensor TC2 is provided on the primary heating medium pipe 25 at a location after which the heating medium has been fed from the heat exchanger HEX1 for exhaust heat recovery. The control valve V1 is controlled so as to open and close based on the detected results of temperature sensor TC2, and as necessary, prevents the exhaust gas from being fed into the heat exchanger HEX1 for exhaust heat recovery by diverting it. In addition, the three-way selector valve V2 is similarly controlled based on the detected results of the temperature sensor TC2, and as necessary, prevents the heating medium from being fed into the heat exchanger HEX1 for exhaust heat recovery by diverting it.

The heat storage tank 13 is disposed lower than the heat exchanger HEX1 for exhaust heat recovery. In addition, an open-air pipe 41 that releases the contents of the heat storage tank 13 into the atmosphere is provided on the heat storage tank 13. One end of the open-air pipe 41 is connected to the heat storage tank 13, and the other end is connected to the exhaust tower 21, which serves as a flow path for the exhaust gas. In addition, a condenser 42 that condenses the steam of the heating medium that evaporates from the heat storage tank 13 is provided on the open-air pipe 41. The condenser 42 is disposed at an angle so that the flow path on the exhaust tower 21 side, which is on the atmosphere side, is higher than the flow path on the tank side. In addition, a lid 43 that includes an insulating material floats inside the heat storage tank 13 so as to cover the surface of the heating medium fluid.

Figure 4A:
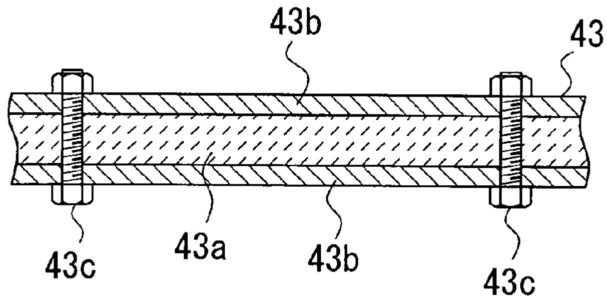
FIG. 4 is a drawing schematically showing a characteristic part of the heat storage tank.
Figure 4B:
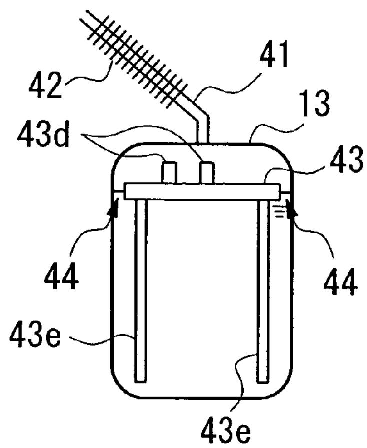
Figure 4C:
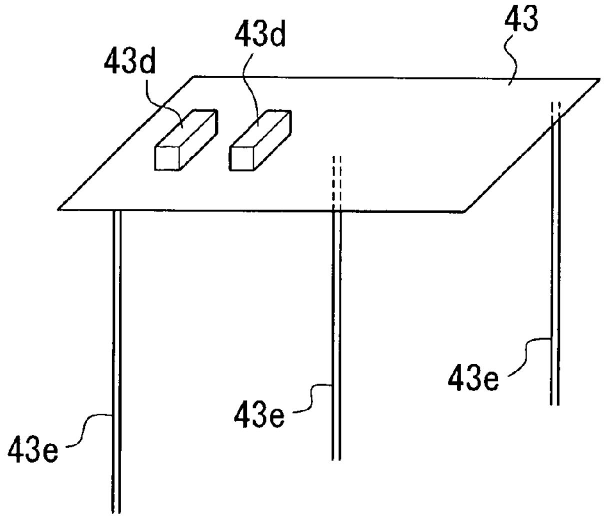

FIGS. 4A through 4C schematically show a characteristic part of the heat storage tank.

FIG. 4A shows an example of the structure of the lid 43 which floats on the heating medium in the heat storage tank 13. In this example, the lid 43 is composed of a bound structure of a resin part **43*a* which serves as an insulation material and a resin part 43*b* such as polypropylene of a plate shape. In addition, by means of a bolt 43*c* for tightening up parts, both of the resin parts 43*a*, 43*b* are fixed to each other, and their separation is prevented. Moreover, in this example, by applying a foaming resin as the insulation material of the lid 43, sufficient buoyancy with respect to the heating medium in the heat storage tank 13** can be obtained.

In addition, as shown in FIGS. 4B and 4C, at the upper face of the lid 43, a block-preventing part **43*d* is provided as a projection to prevent blocking of the open-air pipe 41 accompanying the movement of the lid 43. By providing the block-preventing part 43*d* at the upper face of the lid 43, even when the lid 43 moves along with the movement of the water surface inside the heat storage tank 13, blocking of the open-air pipe 41** can be prevented.

In addition, at the under face of the lid 43, an overturn-preventing part **43*e* is provided which prevents the overturn and reverse of the lid 43. In this example, the overturn-preventing part 43*e* is composed of a number of rod parts extending downward from the under face of the lid 43. By providing the overturn-preventing part 43*e* at the under face of the lid 43, even when the lid 43** moves accompanying the movement of the water surface inside the heat storage tank 13, the reverse and overturn of the lid 43 are prevented, and the heat maintaining effect of the lid 43 is stably maintained.

In addition, between the internal wall of the heat storage tank 13 and the lid 43, a gap 44 is provided to limit the rough movement of the lid 43 accompanying the steam release of the heating medium. By releasing some of the steam upward through the gap 44, violent movement of the lid 43 accompanying the steam release of the heating medium is limited, and the heat maintaining effect by the lid 43 is stably maintained. Moreover, in this example, an opening for releasing steam is the gap 44, however, other embodiments can be applied such as a through hole provided on the lid 43.

Next, the mechanism of the exhaust heat recovery by the exhaust heat recovery system formed as described above will be explained.

First, the exhaust gas discharged from the gas turbine MT is fed into the heat exchanger HEX1 for exhaust heat recovery through the exhaust gas feed pipe 20, the exhaust gas heats the heating medium by heat exchange with the heating medium flowing through the primary heating medium circulation system, and subsequently the exhaust gas is discharged from the exhaust gas tower 21.

The heating medium that has been heated by the heat exchanger HEX1 for exhaust heat recovery flows through the primary heating medium circulation system by the action of the pump P1, and then the heating medium is temporarily stored in the heat storage tank 13. In addition, the heating medium flowing through the primary heating medium circulation system is fed into the heating exchanger HEX2 for heating water, the heating medium heats this water by carrying out heat exchange with the water (hot water) flowing through the water pipe 29, and is then stored in the heat storage tank 13 again. In addition, the hot water heated by the heat exchanger HEX2 for heating water flows through the water pipe 29 by means of the supply pressure of the hot water using facility 12, and is used.

Figure 5:
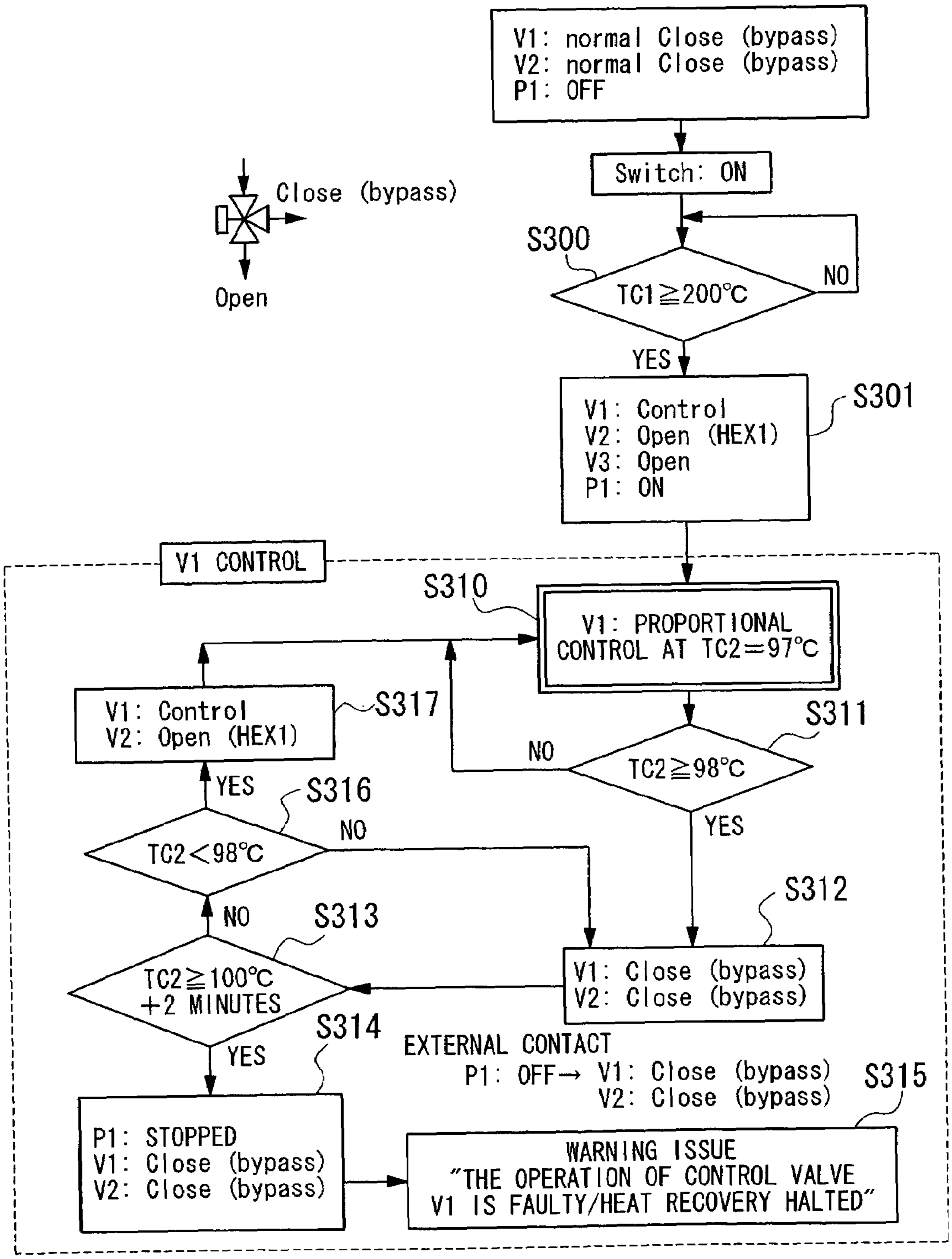
FIG. 5 is a flowchart showing an example of the procedure when operating the exhaust heat recovery system.

Next, the processing flow while the exhaust heat recovery system described above is in operation will be explained with reference to the flowchart shown in FIG. 5.

The initial state of each of the parts of the exhaust heat recovery system before operation is: control valve V1, diverting exhaust gas; three-way selector valve V2, diverting heating medium; and pump P1, stopped.

When the exhaust heat recovery system is started up from this state, in step 300, it is determined whether or not the temperature of the exhaust gas is higher than 200° C. based on the detected results of the temperature sensor TC1. When the temperature of the exhaust gas becomes equal to or greater than 200° C., the state of each of the parts of the exhaust heat recovery system is switched in step 301: the control valve V1 switches to proportional control; the three-way selector valve V2 switches to feeding the heating medium into the heat exchanger HEX1 for exhaust heat recovery; and the pump P1 switches to "in operation". Subsequently, the control process of the exhaust heat recovery system is executed.

In the exhaust heat recovery system control process, first, in step 310, when the temperature of the heating medium immediately following exhaust heat recovery reaches a desired predetermined temperature, for example, 97° C., based on the detected results of the temperature sensor TC2, the control valve V1 is proportionally controlled. The proportional control of this control valve V1 is continuous when the temperature of the heating medium is lower than 98° C. based on the detected results of the temperature sensor TC2.

In addition, when the temperature of the heating medium has not been maintained at 100° C. or greater for two or more minutes in step 313, then in step 316, it is determined whether or not the temperature of the heating medium is lower than 98° C. If it is lower than 98° C., then in step 317, the control valve V1 switches to proportional control, the three-way selector valve V2 switches to feeding the heating medium into the heat exchanger HEX1 for exhaust heat recovery, and the process returns to step 310. In addition, in step 316, when the temperature of the heating medium is 98° C. or higher, the process returns to step 312, and step 312 to step 316 are repeated. Moreover, in this exhaust heat recovery system control process, the settings of each of the temperatures and times described above can be arbitrarily changed within a predetermined range.

In this manner, in the exhaust heat recovery system of the present example, because there is a heat storage tank 13 that temporarily stores the heating medium, a heat storage effect (the effect of maintaining the temperature) occurs due to the heating medium stored in the heat storage tank 13, and thereby the temperature fluctuation of the heating medium is moderated. In addition, because the heat storage tank 13 is an open-air type, a pressure rise in the heating medium does not occur easily, and the temperature of the heating medium easily rises. Thereby, the heating medium can be efficiently heated to a high temperature. Furthermore, because the heat storage tank 13 is an open-air type, bubbles and steam that are generated in the heating medium are separated in the heat storage tank 13 and discharged, and thereby problems due to the mixing of bubbles and steam into the liquid can be avoided. Specifically, in this exhaust heat recovery system, by applying what is called a non-pressurizing structure, the heating medium is heated to a temperature near the boiling point, and this high temperature state can be stably maintained. Accompanying this, water for circulation is heated to a high temperature, and the high temperature state can be stably maintained. In addition, because the tank is an open-air type, the use of a high-cost pressure-resistant structure can be avoided, and thereby cost reductions can be realized.

In this case, because the heat storage tank 13 is disposed lower than the heat exchanger HEX1 for exhaust heat recovery, the heating medium inside the piping lines including the heat exchanger HEX1 for exhaust heat recovery easily returns to the heat storage tank 13 due to gravity. Therefore, for example, if the heating medium experiences abnormal boiling, it is possible to return the heating medium to the tank, and make it settle. In addition, during long periods of stopped operation, and the like, by returning the heating medium inside piping lines including the heat exchanger HEX1 for exhaust heat recovery to the heat storage tank 13 and keeping them in a dry condition, there is an advantage in that corrosion can be minimized.

In addition, in the exhaust heat recovery system of the present example, because one end of the open-air pipe 41 is connected to the heat storage tank 13, and the other end is connected to the exhaust tower 21 which serves as a flow path of the exhaust gas, the inside of the heat storage tank 13 can be reliably opened to the atmosphere. In addition, if steam of the heating medium is sprayed, dispersion to the outside can be prevented.

In addition, in the exhaust heat recovery system of the present example, because the condenser 42 which condenses steam of the heating medium evaporated from the heat storage tank 13 is provided on the open-air pipe 41, the steam of the heating medium evaporated from the heating tank 13 is condensed in this condenser 42, and is returned to the heat storage tank 13. Thereby, a decrease in the volume of the heating medium can be limited. In this case, because the condenser 42 is disposed such that the flow path on the atmosphere side is higher than the flow path on the heat storage tank 13, the steam of the heating medium condensed at the condenser 42 reliably returns to the tank.

In addition, in the exhaust heat recovery system of the present example, because a lid 43 that includes an insulating material floats on the heating medium in the heat storage tank 13, a temperature maintaining effect is established, and even though the tank is open to the atmosphere, the amount of heat energy that escapes into the atmosphere is limited, and the energy recovered from the exhaust gas can be used without loss.

In addition, in the exhaust heat recovery system of the present example, because the heat exchanger HEX2 for heating water is a plate-type heat exchanger, an efficient heat exchange having a high heat transfer rate can be realized by complete counter-flow and the like. Thereby, the temperature of the water that will be circulated and used in the facility 12 can be quickly raised.

In addition, in the exhaust heat recovery system of the present example, the temperature of the heating medium heated by the heat exchanger HEX1 for exhaust heat recovery is continuously detected by the temperature sensor TC2, and the amount of exhaust gas fed into the heat exchanger HEX1 for exhaust heat recovery is controlled by the control valve V1 based on the detected results thereof. In addition, when the heating medium rises above a predetermined temperature, the exhaust gas that is to be fed into the heat exchanger HEX1 for exhaust heat recovery is discharged to the atmosphere by being diverted to the bypass flow path 35 before being fed. Thus, in the heat exchanger HEX1 for exhaust heat recovery, only the necessary amount of heat energy is recovered, and the excess heat energy is discharged to the atmosphere without being fed into the heat exchanger HEX1 for exhaust heat recovery. Thereby, a conventional cooling facility becomes unnecessary, and cost reductions can be realized based on this factor as well.

Figure 6:
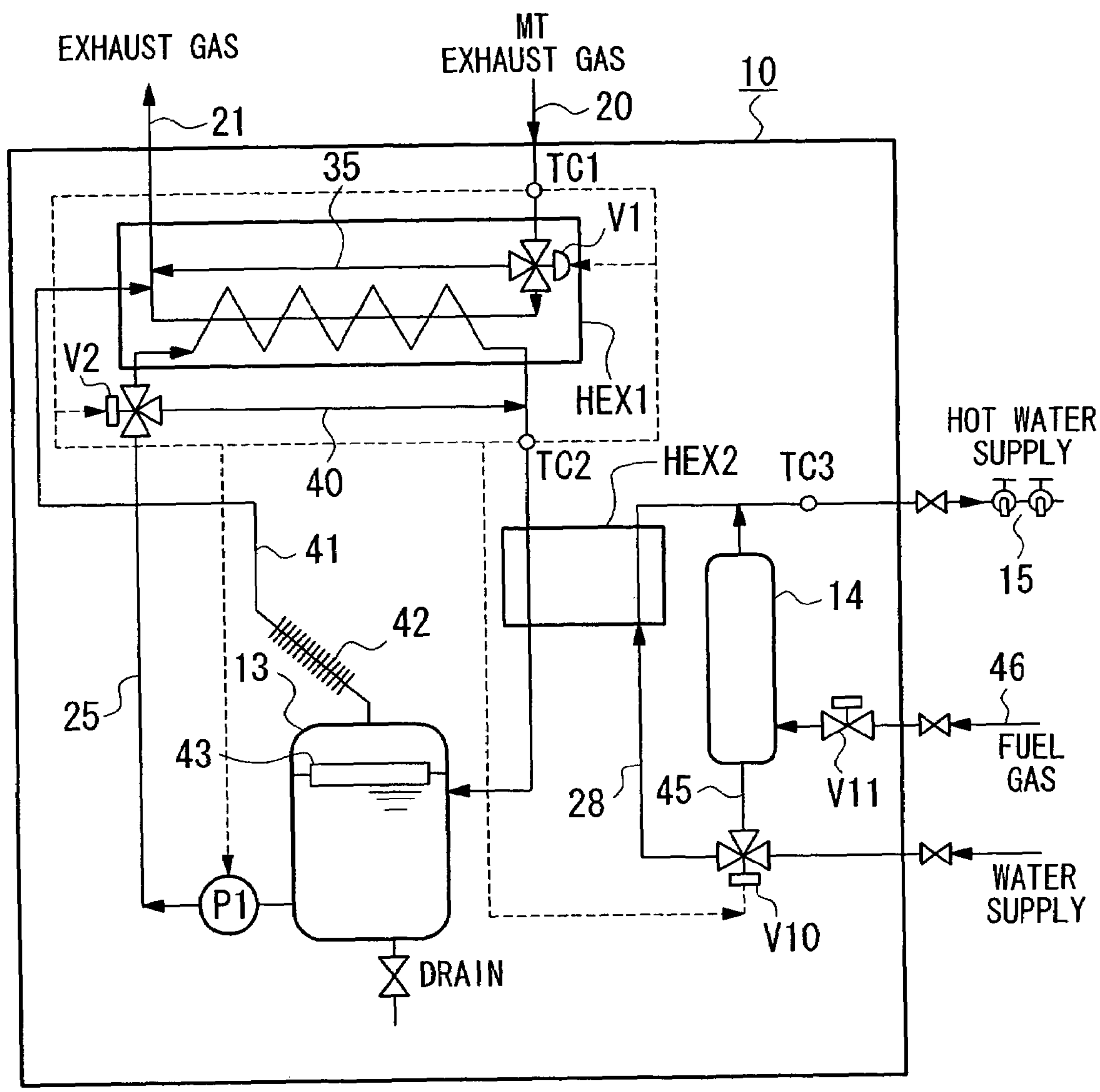
FIG. 6 is a drawing showing the structure of the second embodiment of the exhaust heat recovery system of the present invention.
Figure 7:
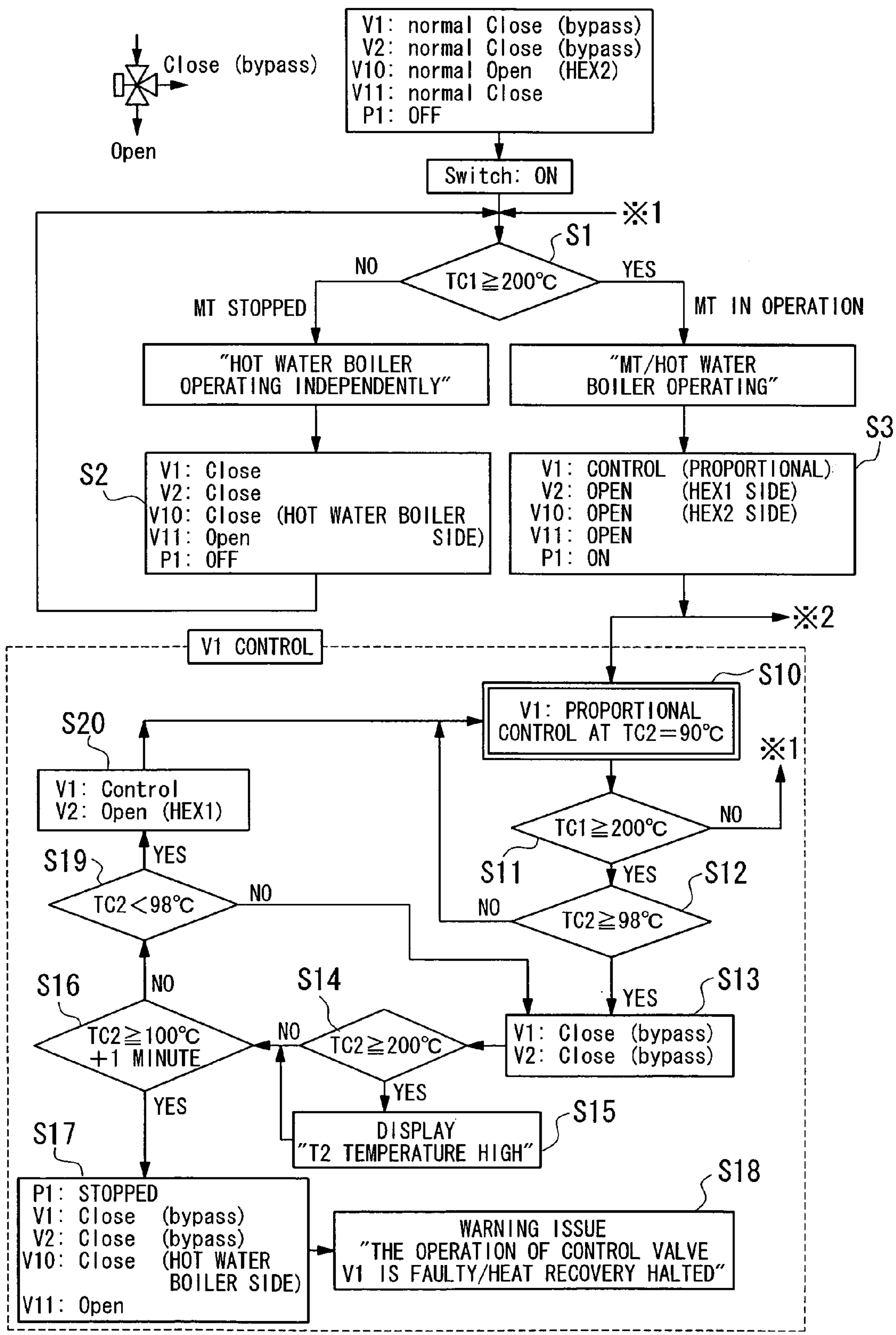
FIG. 7 is a flowchart showing an example of the processing procedure when operating the exhaust heat recovery system in FIG. 6.

Next, a second embodiment of the exhaust heat recovery system of the present invention will be explained with reference to FIG. 6, FIG. 7, and FIG. 8. The exhaust heat recovery system 10 of the present embodiment heats water for hot water supply using heat of the exhaust gas produced at the electric power generator. Moreover, essential components having a function identical to those already explained in the first embodiment have identical reference numerals, and their explanation is omitted or simplified.

In the exhaust heat recovery system of the present embodiment, unlike the first embodiment described above, there is a gas hot water boiler 14 that serves as an auxiliary heating apparatus. In addition, the heat exchanger HEX2 for heating water heats water to actually be used for hot water supply.

The heat exchanger HEX1 for exhaust heat recovery, the heat storage tank 13, and the pump P1 are connected by a primary heating medium pipe 25 that forms the primary heating medium circulation system that circulates the heating medium. In addition, the heat exchanger HEX2 for heating water is a plate-type heat exchanger, and is connected to the heat storage tank 13 and a water pipe 28 that supplies water in the water line to a hot water supply column 15 as a water supply source. Moreover, the supply pressure of the water in the water pipe 28 is provided by the water supply source side.

A temperature sensor TC3 that detects the temperature of the water after being heated is disposed on the water pipe 28 located directly after the confluence of the pipe located after which the water has been conveyed from of the heat exchanger HEX2 for heating water and the pipe located after which the water has been conveyed from a gas hot water boiler 14. Moreover, this temperature sensor TC3 is used to confirm the temperature of the hot water supply.

In addition, a three-way selector valve V10 and a bypass pipe 45 that divert water fed into the heat exchanger HEX2 for heating water to the outlet side of the heat exchanger HEX2 for heating water are provided on the water pipe 28, and the gas hot water boiler 14 described above is provided on the bypass pipe 45. In addition, a gas pipe 46 that receives a supply of gas from a gas supply system constituted separately is connected to the gas hot water boiler 14, and a gas feed valve V11 that interrupts and allows the feeding of the gas to the gas hot water boiler 14 is provided on the gas pipe 46. Moreover, the three-way selector valve V10 is controlled based on the detected results of the temperature sensor TC2 described above, and as necessary the water is fed into the gas hot water boiler 14 by diverting it at the heat exchanger HEX2 for heating water. The gas hot water boiler 14 is operated by detecting the feeding of water when the three-way selector valve V10 opens on the gas hot water boiler 14 side, and the fed water is heated. In addition, the auxiliary heating device of the present invention is structured to include the gas hot water boiler 14 and the three-way selector valve V10.

Next, the mechanism of the exhaust heat recovery by the exhaust heat recovery system formed as described above will be explained.

First, the exhaust gas discharged from the gas turbine MT is fed into the heat exchanger HEX1 for exhaust heat recovery through the exhaust gas feed pipe 20, and the exhaust gas heats the heating medium by heat exchange with the heating medium flowing through the primary heating medium circulation system, and subsequently the exhaust gas is discharged from the exhaust gas tower 21.

The heating medium that has been heated by the heat exchanger HEX1 for exhaust heat recovery flows through the primary heating medium circulation system by the action of the pump P1, and the heating medium is temporarily stored in the heat storage tank 13. In addition, the heating medium flowing through the primary heating medium circulation system is fed into the heating exchanger HEX2 for heating water, the heating medium heats this water by carrying out heat exchange with the water flowing through the water pipe 28, and is then stored in the heat storage tank 13 again. In addition, the water (hot water) heated by the heat exchanger HEX2 for heating water flows through the water pipe 28 by means of the supply pressure of the water supply source, and is used after flowing outside of the system when the hot water supply column 15 is opened.

Next, the process flow when operating the exhaust heat recovery system described above will be explained with reference to the flowcharts shown in FIG. 7 and FIG. 8.

The initial condition of each part of the exhaust heat recovery system before operation is: control valve V1, diverting exhaust gas; three-way selector valve V2, diverting heating medium; three-way selector valve V10, feeding water into the heat exchanger HEX2 for heating water; gas feed valve V11, closed; and pump P1, stopped.

When the exhaust heat recovery system is started up from this condition, in step 1, it is determined whether or not the temperature of the exhaust gas is higher than 200° C. based on the detected results of the temperature sensor TC1. Then, in the case that the temperature of the exhaust gas is lower than 200° C., the gas turbine MT is considered to be out of operation, and the state of each part of the exhaust heat recovery system switches to "hot water boiler operating independently" in step 2, and the control valve V1 switches to diverting the exhaust gas; the three-way selector valve V2 switches to diverting the heating medium; the three-way selector valve V10 switches to feeding water into the gas hot water boiler 14; the gas feed valve V11 switches to open, and the pump P1 switches to OFF.

In addition, in step 1, if the temperature of the exhaust gas is equal to or greater than 200° C., the gas turbine MT is considered to be in operation, and the state of each part of the exhaust heat recovery system switches to "gas turbine/gas hot water boiler operating" in step 3, and the control valve V1 switches to proportional control; the three-way selector valve V2 switches to feeding heating medium into the heat exchanger HEX1 for exhaust heat recovery; the three-way selector valve V10 switches to feeding water into the heat exchanger HEX2 for heating water; the gas feed valve V11 switches to open; and the pump P1 switches to "in operation". Subsequently, the control process of the exhaust heat recovery system and the hot water supply control process are executed.

In the exhaust heat recovery system control process, first, in step 10, when the temperature of the heating medium immediately after exhaust heat recovery has reached a desired set temperature, for example, 90° C., based on the detected results of the temperature sensor TC2, the control valve V1 is proportionally controlled. The proportional control of this control valve V1 is carried out continuously when the temperature of the exhaust gas is equal to or greater than 200° C. based on the detected results of the temperature sensor TC1 and the temperature of the heating medium is lower than 98° C. based on the detected results of the temperature sensor TC2. Moreover, in step 11, when the temperature of the exhaust gas becomes lower than 200° C. based on the detected results of the temperature sensor TC1, the processing returns to step 1, and switches to "hot water boiler operating independently".

In addition, in step 12, if the temperature of the heating medium is equal to or greater then 98° C. based on the detected results of the temperature sensor TC2, the process proceeds to step 13, and control valve V1 switches to diverting exhaust gas and the three-way selector valve V1 switches to diverting heating medium. In step 14, when the temperature of the heating medium is equal to or greater than 200° C., in step 15, a display showing that the temperature of the heating medium is a high temperature is displayed. Furthermore, when it has been confirmed in step 16 that the temperature of the heating medium has been maintained equal to or greater than 100° C. for 60 or more seconds, the state switches to the same state as the "hot water boiler operating independently" described above in step 17, and in step 18, a warning that "the operation of control valve V1 is faulty/heat recovery halted" is issued.

In addition, in step 16, if the temperature of the heating medium is not maintained equal to or greater than 100° C. for 60 or more seconds, in step 19 it is determined whether or not the temperature of the heating medium is lower than 98° C. If it is lower than 98° C., then in step 20, the control valve V1 switches to proportional control and the three-way selector valve V2 switches to feeding heating medium into the heat exchanger HEX1 for exhaust heat recovery, and the process returns to step 10. In addition, in step 19, if the temperature of the heating medium is higher than 98° C., the process returns to step 13, and step 13 to step 19 are repeated. Moreover, in this exhaust heat recovery system control process, the settings of each of the temperatures and times can be arbitrarily changed within a predetermined range.

Figure 8:
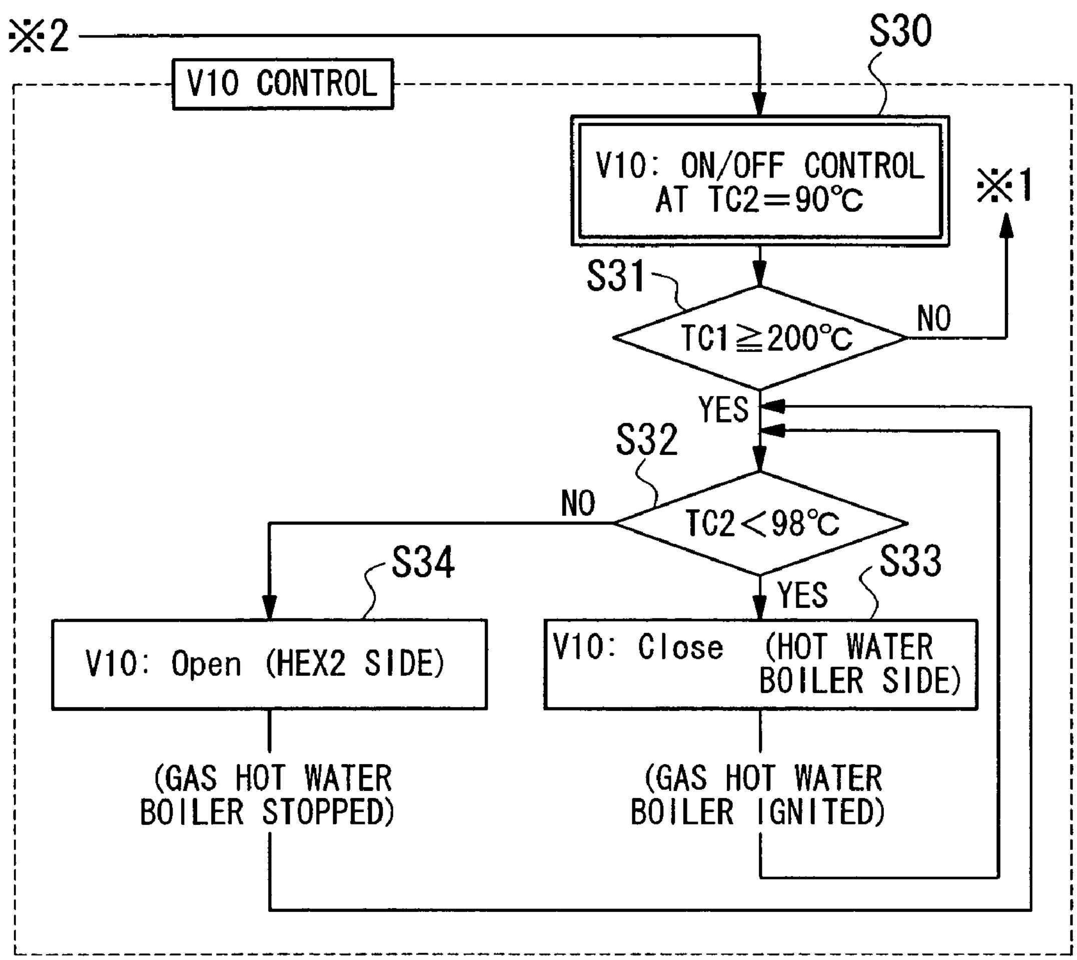
FIG. 8 is a flowchart showing an example of the processing procedure for the hot water supply temperature control in the exhaust heat recovery system in FIG. 6.

FIG. 8 is a flowchart of the hot water supply temperature control process. In the hot water supply temperature control process, first, in step 30, when the temperature of the heating medium reaches a desired predetermined temperature, for example 90° C., based on the detected results of the temperature sensor TC2, ON/OFF control of the three-way selector valve V10 is carried out. Specifically, when it has been confirmed in step 31 that the temperature of the exhaust gas is equal to or greater than 200° C. based on the detected results of the temperature sensor TC1 and it has been confirmed in step 32 that the temperature of the heating medium is lower than 98° C. based on the detected results of the temperature sensor TC2, then in step 33 the three-way selector valve V10 is switched to the gas hot water boiler 14 side, the gas hot water boiler 14 is ignited, and the water is heated. In addition, when it has been confirmed in step 32 that the temperature of the heating medium has exceeded 98° C., in step 34, the three-way selector valve V10 is switched to the heat exchanger HEX2 for heating water side, and the water is heated by heat exchange with the exhaust gas. Moreover, in the hot water supply temperature control process, the settings of each of the temperatures can be arbitrarily changed within a predetermined range.

In addition, in the exhaust heat recovery system of the present example, like the first embodiment, by applying what is called a non-pressurizing structure, the heating medium is heated to a temperature near the boiling point, and this high temperature state can be stably maintained. Accompanying this, water for hot water supply is heated to a high temperature, and the high temperature state can be stably maintained. In addition, because the tank is an open-air type, the use of a high-cost pressure-resistant structure can be avoided, and thereby cost reductions can be realized.

In addition, in the exhaust heat recovery system of the present example, because the heat exchanger HEX2 for heating water is a plate-type heat exchanger, an efficient heat exchange having a high heat transfer rate can be realized by complete counter-flow and the like. Thus, even if the feed path of the water into the heat exchanger HEX2 for heating water is not a circulating system, water from the water line that has a relatively low temperature can be heated to a temperature close to that of the heating medium. Thereby, a circulating path for the water becomes unnecessary, and cost reductions can be realized. In addition, along with a shortening of the path, the loss of heat energy becomes small, and an increase in the energy efficiency of the system as a whole can be realized.

In addition, in the exhaust heat recovery system of the present example, if the temperature of the heating medium that is heated by the heat exchanger HEX1 for exhaust heat recovery has not reached a predetermined temperature based on the detected results of the temperature sensor TC2, the water fed into the heat exchanger HEX2 for heating water is diverted by the three-way selector valve V10, and the diverted water is heated by the gas hot water boiler 14. Thereby, the temperature of the water for hot water supply can be stably maintained in a high temperature state.

Next, a third embodiment of the exhaust heat recovery system of the present invention will be explained with reference to FIG. 9 and FIG. 10. The exhaust heat recovery system 10 of the present embodiment heats a heating medium which is circulated and used in the predetermined facility, such as air conditioning, using heat of the exhaust gas produced at the electric power generator. Moreover, essential components having a function identical to those already explained in the first and the second embodiments have identical reference numerals, and their explanation is omitted or simplified.

In the exhaust heat recovery system of the present embodiment, unlike the first and the second embodiments described above, the heating medium circulated and used in a predetermined facility is heated directly by the heat exchanger HEX1 for exhaust heat recovery.

Figure 9:
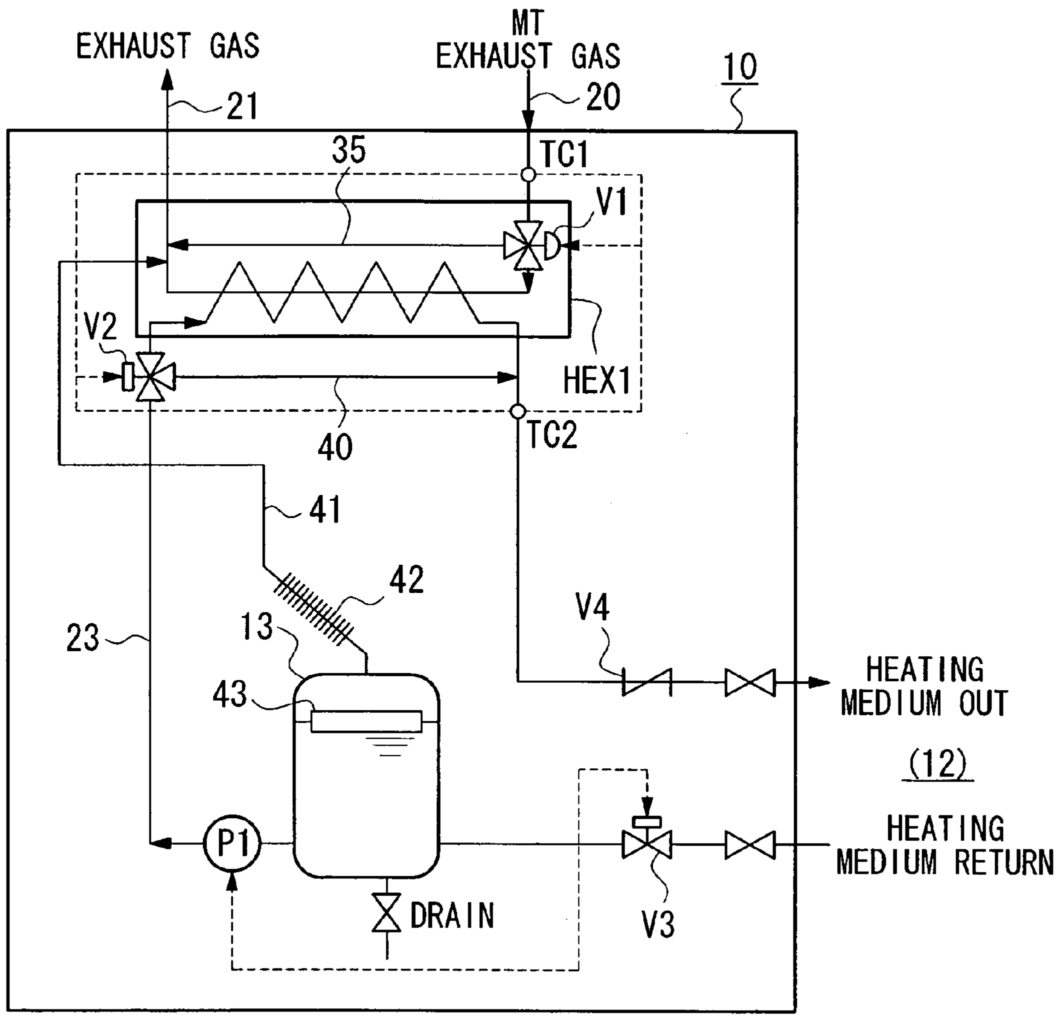
FIG. 9 is a drawing showing the structure of the third embodiment of the exhaust heat recovery system of the present invention.
Figure 10:
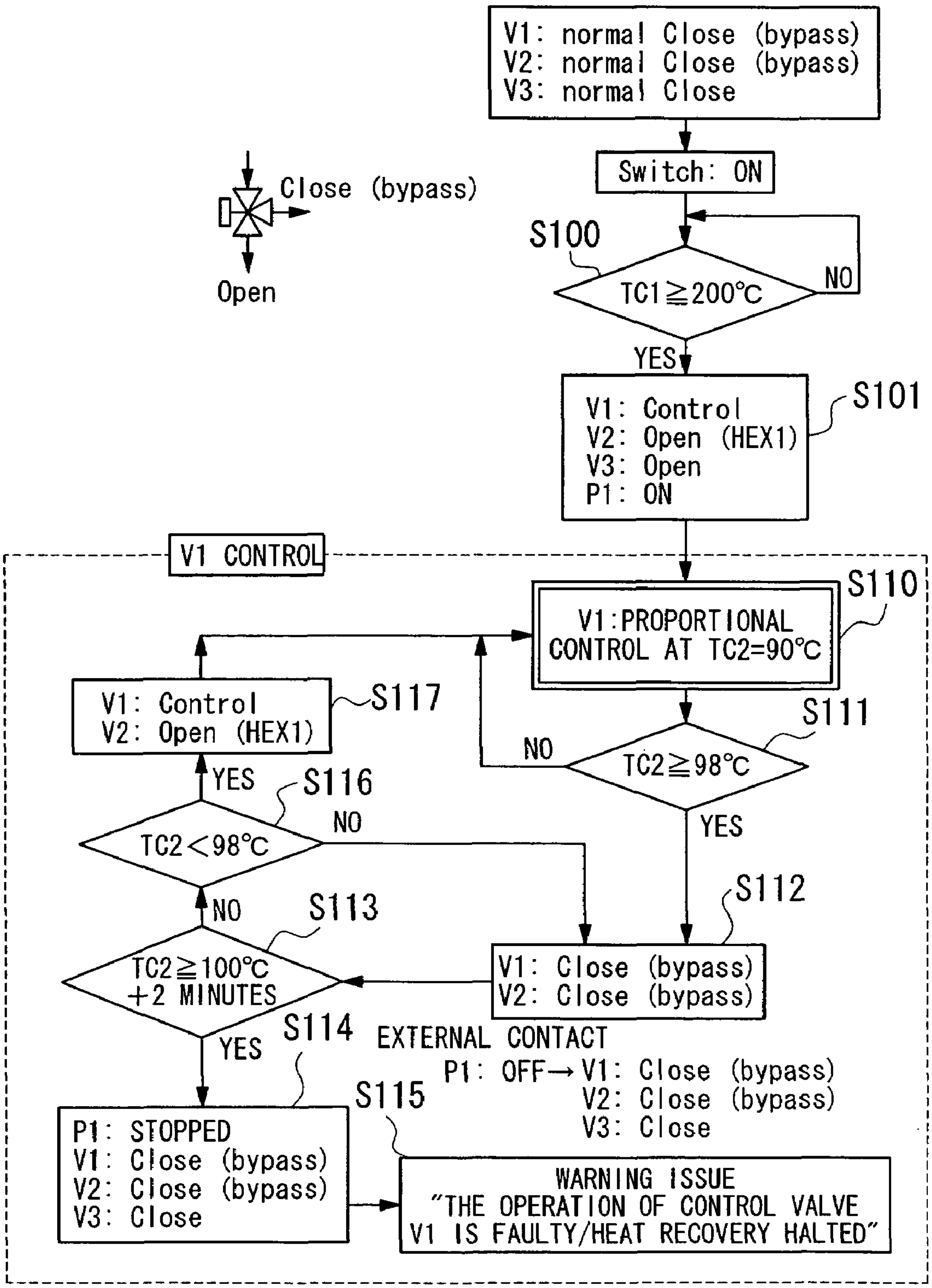
FIG. 10 is a flowchart showing an example of the processing procedure when operating the exhaust heat recovery system in FIG. 9.

In FIG. 9, the heat exchanger HEX1 for exhaust heat recovery, the heat storage tank 13, and the pump P1 are connected by the heating medium pipe 23 that forms the heating medium conveyance system that conveys the heating medium.

A three-way selector valve V2 and a bypass pipe 40 that divert heating medium to be fed into the heat exchanger HEX1 for exhaust heat recovery to the outlet side of the heat exchanger HEX1 for exhaust heat recovery are provided on the heating medium pipe 23. In addition, an electromagnetic valve V3 that controls the conveyance of the heating medium synchronously with the pump P1 is provided on the heating medium pipe 23 at a location before the heating medium is fed into the heat storage tank 13.

A temperature sensor TC2 is provided on the heating medium pipe 23 at a location after which the heating medium is conveyed from the heat exchanger HEX1 for exhaust heat recovery. The temperature sensor TC2 serves as a temperature detecting device that detects the temperature of the heating medium. In addition, a check valve V4 is provided on the heating medium pipe 23 beyond the location where the temperature sensor TC2 is provided. The check valve V4 stops the reverse flow of the heating medium from a predetermined facility 12 such as air conditioning into the heat exchanger HEX1 for exhaust heat recovery.

Next, the mechanism of the exhaust recovery by the exhaust heat recovery system formed as described above will be explained.

First, the exhaust gas discharged from the gas turbine MT is fed into the heat exchanger HEX1 for exhaust heat recovery through the exhaust gas feed pipe 20, the heating medium is heated by heat exchange being carried out between the exhaust gas and the heating medium flowing through the heating medium conveyance system, and subsequently, the exhaust gas is discharged from the exhaust gas tower 21.

The heating medium heated in the heat exchanger HEX1 for exhaust heat recovery flows through the heating medium conveyance system by the action of the pump P1, and it is circulated and used as the heating medium for the predetermined facilities 12 such as air conditioning. In addition, after the heating medium returning from the predetermined facility 12 is stored temporarily in the heat storage tank 13, it is fed again into the heat exchanger HEX1 for exhaust heat recovery.

In addition, in the heat storage tank 13, the lid 43 that includes insulating material floats so as to cover the surface of the heating medium fluid, and thus a heat maintaining effect is attained, and thereby, even though the heat storage tank 13 is open to atmosphere, the amount of heat energy that escapes into the atmosphere is limited, and the heat energy recovered from the exhaust heat can be used without loss.

In addition, because the condenser 42 is provided on the open-air pipe 41 connected to the heat storage tank 13, steam of the heating medium that evaporates from the heat storage tank 13 is condensed at the condenser 42, and returns to the tank. Thereby, a decrease in the volume of the heating medium can be limited.

Next, the process flow when operating the exhaust heat recovery system described above will be explained with reference to FIG. 10.

The initial condition for each part of the exhaust heat recovery system before operation is: control valve V1, diverting exhaust gas; three-way selector valve V2, diverting heating medium; and electromagnetic valve V3, closed.

When the exhaust heat recovery system is started up from this state, in step 100, it is determined whether or not the exhaust gas temperature is higher than 200° C. based on the detected results of the temperature sensor TC1, and when the exhaust gas temperature is equal to or greater than 200° C., in step 101, the state of each part of the exhaust heat recovery system becomes: control valve V1 switches to proportional control; three-way selector valve V2 switches to feeding the heating medium into the heat exchanger HEX1 for exhaust heat recovery; electromagnetic valve V3 switches to open; and pump P1 switches to operating. Subsequently, the control process of the exhaust heat recovery system is executed.

In the exhaust heat recovery system control process, first, in step 110 when the temperature of the heating medium immediately after exhaust heat recovery reaches the desired set temperature, for example, 90° C., based on the detected result of the temperature sensor TC2, the control valve V1 is proportionally controlled. This proportional control of the control valve V1 is continuously carried out while the temperature of the heating medium is lower than 98° C. based on the detected results of the temperature sensor TC2.

Then, in step 111, if the temperature of the heating medium is equal to or greater than 98° C. based on the detected results of the temperature sensor TC2, the process proceeds to step 112, in which the control valve V1 is switched to diverting exhaust gas and the three-way selector valve V2 is switched to diverting the heating medium. When it has been confirmed in step 113 that the temperature of the heating medium has been maintained equal to or greater than 100° C. for two or more minutes, in step 114, the state of each part of the exhaust heat recovery system is switched to a state identical to the initial conditions already described, and in step 115, a warning that "the operation of control valve V1 is faulty/heat recovery halted" is issued.

Next, when the temperature of the heating medium has not been maintained equal to or greater than 100° C. for two or more minutes in step 113, in step 116, it is determined whether or not the temperature of the heating medium is lower than 98° C. If it is lower than 98° C., then in step 117, the control valve V1 is switched to proportional control, the three-way selector valve V2 switches to feeding heating medium into the heat exchanger HEX1 for exhaust heat recovery, and the process returns to step 110. In addition, in step 116, when the temperature of the heating medium is 98° C. or higher, the process returns to step 112, and step 112 to step 116 are repeated. Moreover, in this exhaust heat recovery system control process, the settings of each of the temperatures and times described above can be arbitrarily changed within a predetermined range.

In this manner, in the exhaust heat recovery system of the present example, the heating medium circulated and used in a predetermined facility is heated directly by the heat exchanger HEX1 for exhaust heat recovery. At this time, the temperature of the heating medium heated by the heat exchanger HEX1 for exhaust heat recovery is continuously detected by the temperature sensor TC2, and based on this detected result, the amount of exhaust gas fed into the heat exchanger HEX1 for exhaust heat recovery is controlled by the control valve V1. In addition, when the temperature of the heating medium has risen above a predetermined temperature, the exhaust gas to be fed into the heat exchanger HEX1 for exhaust heat recovery is diverted to the bypass flow path 35 before feeding, and discharged to the atmosphere. Thereby, in the heat exchanger HEX1 for exhaust heat recovery, only the necessary amount of heat energy is recovered, and the excess heat energy is discharged into the atmosphere without being fed into the heat exchanger HEX1 for exhaust heat recovery. Thereby, the conventional cooling facility becomes unnecessary, and cost reductions can be realized. In addition, in this exhaust heat recovery system, because the heating medium circulated and used in a predetermined facility is directly heated by the heat exchanger HEX1 for exhaust heat recovery, the loss of heat energy is low compared to the conventional providing of multi-stage heat exchangers. Thus, an improvement in energy efficiency in the entire system can be realized.

In addition, in the exhaust heat recovery system in the present example, because there is a heat storage tank 13 that temporarily stores the heating medium, the heating medium is heated to a temperature near the boiling point, and this high temperature state can be stably maintained. Thereby, in a predetermined facility that circulates and uses this heating medium, various advantages such as decreasing the amount of fuel can be obtained. In addition, because the tank is an open-air type, the use of a high-cost pressure-resistant structure can be avoided, and thereby cost reductions can be realized.

In addition, in the exhaust heat recovery system of the present example, although the heating medium can be easily made to flow in reverse due to providing a tank that is an open-air type, the reverse flow of the heating medium from the predetermined facility into the heat exchanger HEX1 for exhaust heat recovery can be prevented by the check valve V4, and thereby the problems that accompany the reverse flow of the heating medium can be avoided.

Figure 11:
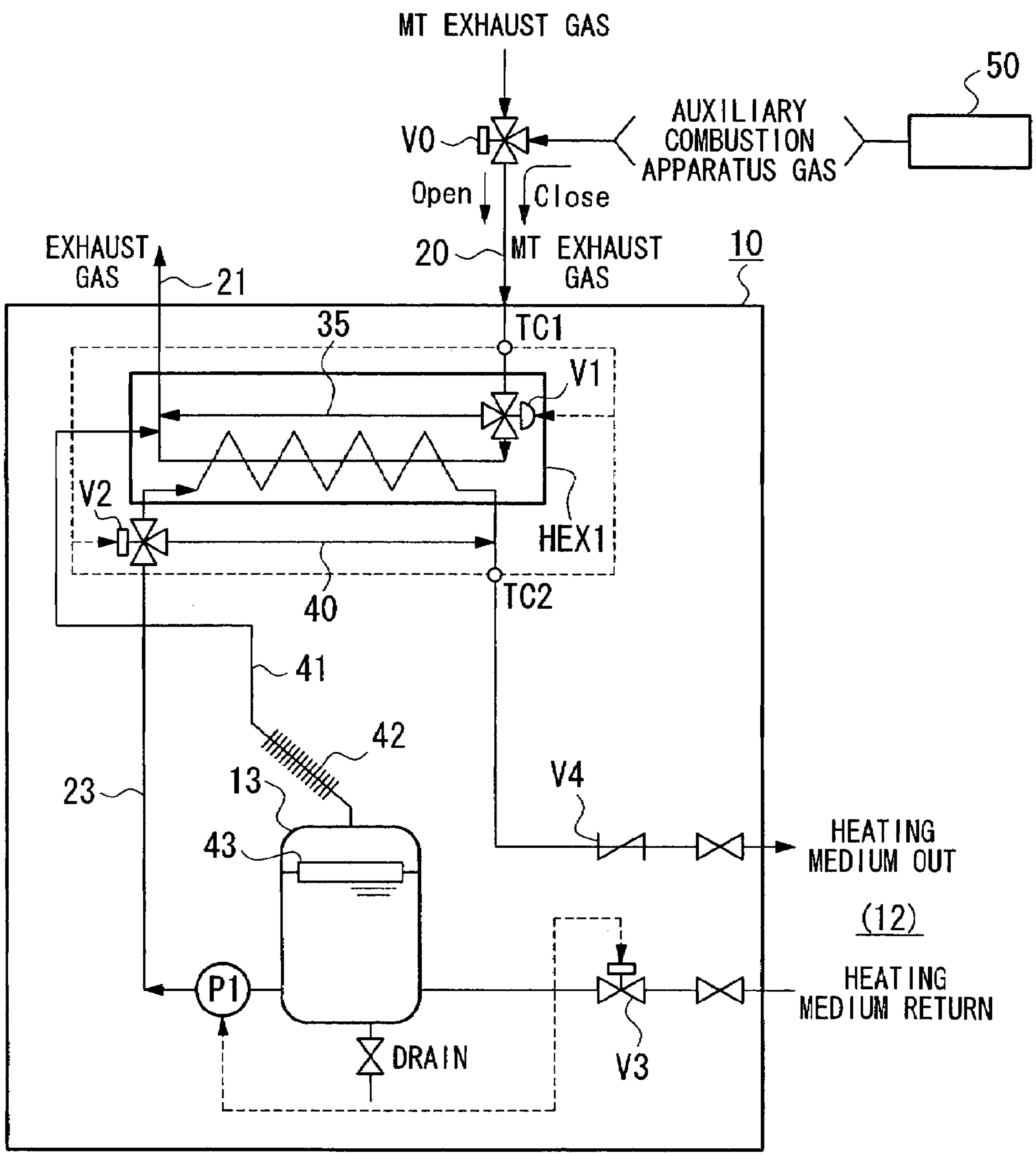
FIG. 11 is a drawing showing the structure of the fourth embodiment of the exhaust heat recovery system of the present invention.
Figure 12:
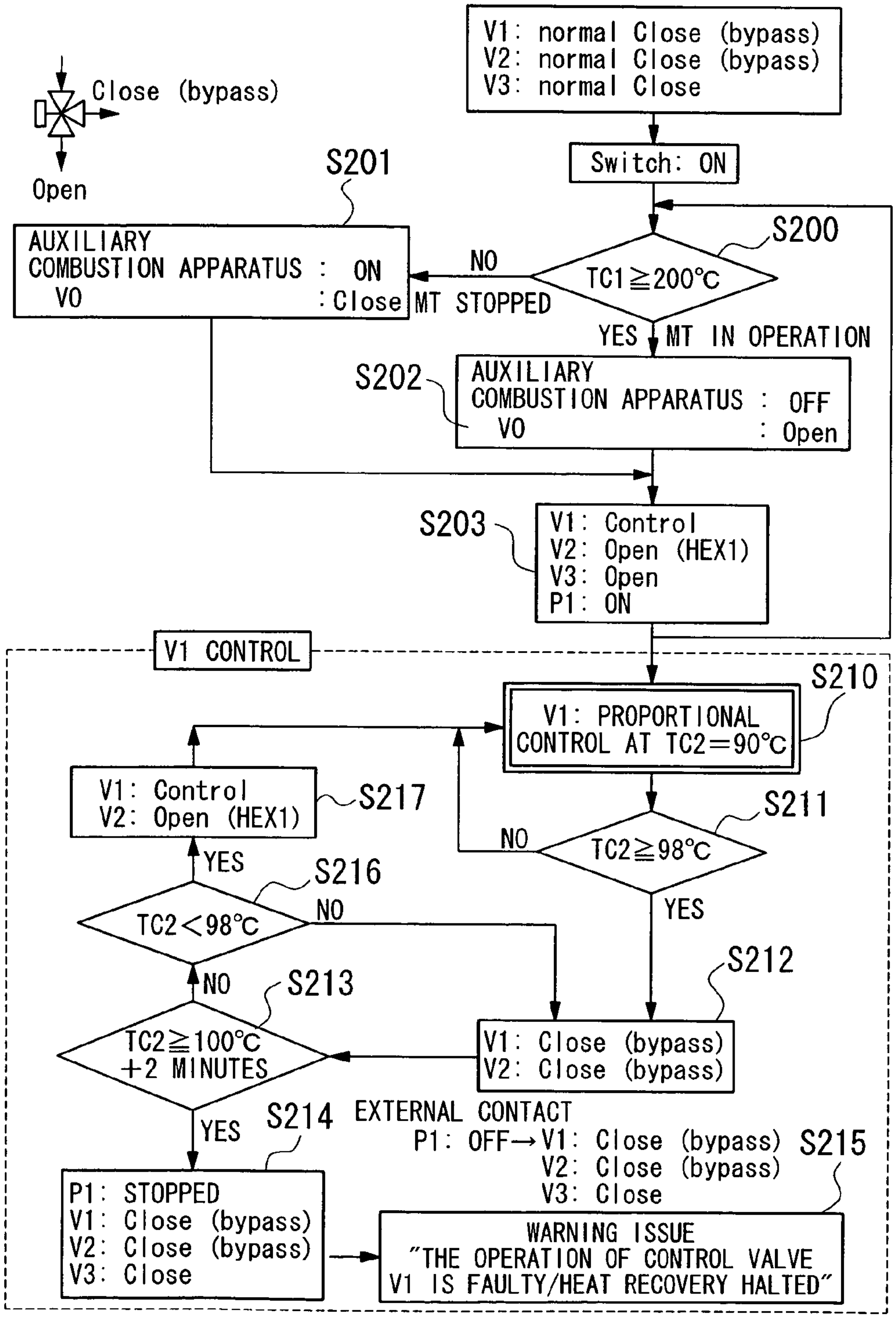
FIG. 12 is a flowchart showing an example of the processing procedure when operating the exhaust heat recovery system in FIG. 11.
Figure 13:
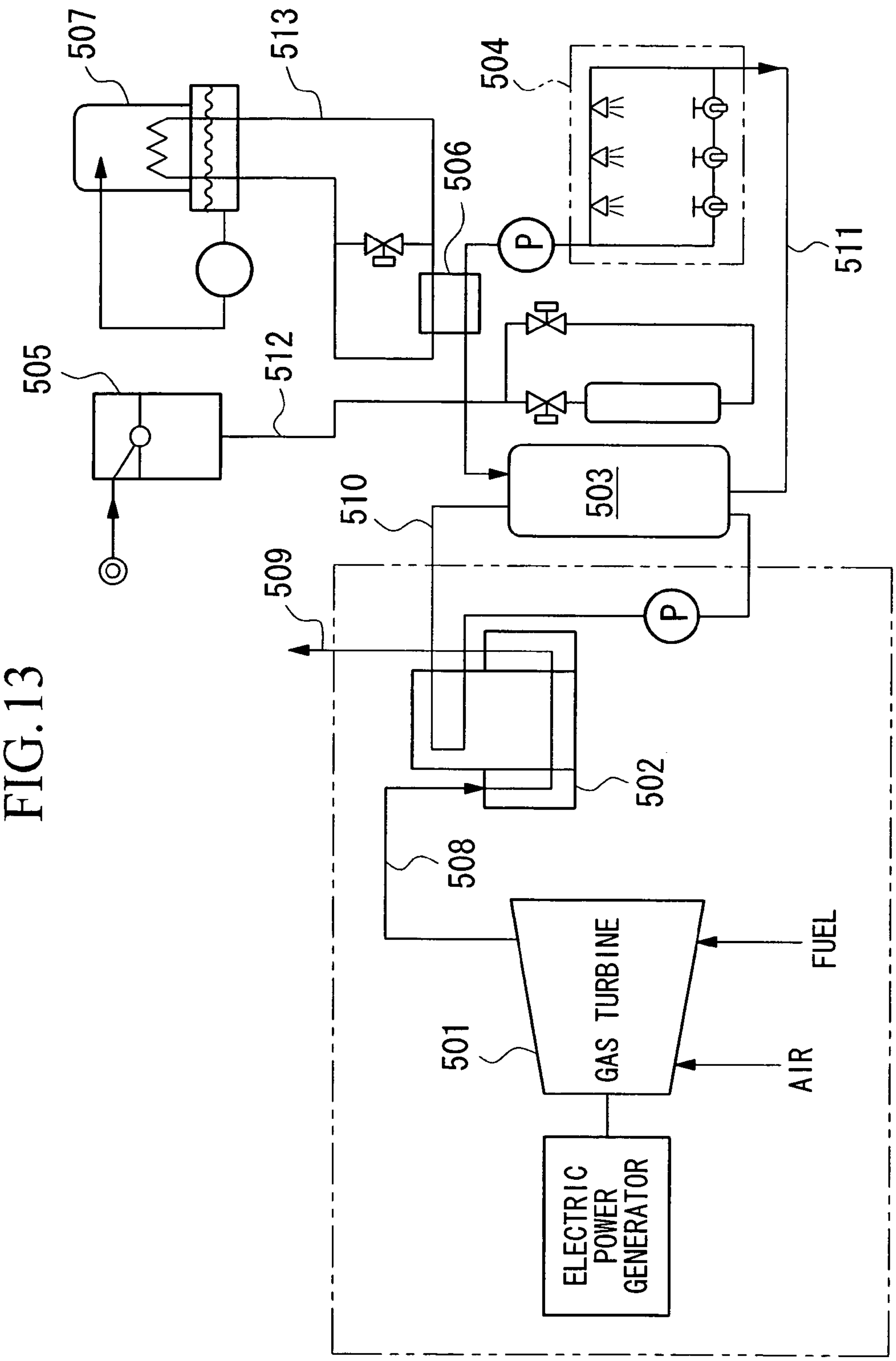
FIG. 13 is a drawing showing the structure of a conventional exhaust heat recovery system.

Next, a fourth embodiment of the exhaust heat recovery system of the present invention will be explained with reference to FIG. 11 and FIG. 12. Like the third embodiment described above, the exhaust heat recovery system 10 of the present embodiment also uses the heat of an exhaust gas generated by an electric generator, and heats the heating medium circulated and used in a predetermined facility such as air conditioning. Moreover, essential components having a function identical to those already explained in the first embodiment have identical reference numerals, and their explanation is omitted or simplified.

In the exhaust heat recovery system of the present embodiment, unlike the each embodiment described above, there are an auxiliary combustion apparatus 50 that serves as an auxiliary combustion gas feeding device that feeds combustion gas to the heat exchanger HEX1 for exhaust heat recovery separately from the exhaust gas from the gas turbine MT (refer to FIG. 1), and a three-way selector valve V0.

The auxiliary combustion apparatus 50 can generate combustion gas having substantially the same temperature and amount as the exhaust gas from the gas turbine MT, and, for example, an atmospheric pressure gas combustor can be used. In addition, the three-way selector valve V0 switches between feeding exhaust gas from the gas turbine MT to the heat exchanger HEX1 for exhaust heat recovery and feeding combusted gas from the auxiliary combustion apparatus 50, and the auxiliary combustion apparatus 50 is provided on the exhaust gas feed pipe 20 between the gas turbine MT and the heat exchanger HEX1 for exhaust heat recovery.

Next, the mechanism of the exhaust heat recovery by the exhaust heat recovery system formed as described above will be explained.

First, the exhaust gas discharged from the gas turbine MT is fed into the heat exchanger HEX1 for exhaust heat recovery through the exhaust gas feed pipe 20, the exhaust gas heats the heating medium by carrying out heat exchange with the heating medium flowing through the heating medium conveyance system, and subsequently, the exhaust gas is discharged from the exhaust gas tower 21.

In addition, when problems occur in the electric generator, during stoppages of the electric generator, or the like, the auxiliary combustion apparatus 50 is operated at a predetermined timing. The exhaust gas generated by the auxiliary combustion apparatus 50 is fed into the heat exchanger HEX1 for exhaust heat recovery via the three-way selector valve V0 separately from the exhaust gas from the gas turbine MT. At this time, for example, in addition to the exhaust gas from the electric generator, or instead of this exhaust gas, the auxiliary combustion gas is fed into the heat exchanger HEX1 for exhaust heat recovery, and the temperature of the heating medium is stably maintained by heating the heating medium.

The heating medium heated in the heat exchanger HEX1 for exhaust heat recovery flows through the heating medium conveyance system due to the action of the pump P1, and is circulated and used as a heating medium for a predetermined facility such as air conditioning. In addition, after the heating medium that has returned from the predetermined facility 12 has been stored temporarily in the heat storage tank 13, it is again fed into the heat exchanger HEX1 for exhaust heat recovery.

Next, the process flow while the exhaust heat recovery system described above is in operation will be explained with reference to FIG. 12.

The initial condition for each part of the exhaust heat recovery system before operation is: control valve V1, diverting exhaust gas; three-way selector valve V2, diverting heating medium; and electromagnetic valve V3, closed.

When the exhaust heat recovery system is started up from this state, in step 200, it is determined whether or not the exhaust gas temperature is higher than 200° C. based on the detected results of the temperature sensor TC1. Additionally, in the case that the exhaust gas temperature is lower than 200° C., the gas turbine MT is considered to be out of operation, and in step 201, the auxiliary combustion apparatus begins operation, the three-way selector valve V0 opens on the auxiliary combustion apparatus 50 side, and in place of the exhaust gas from the gas turbine MT, the combustion gas from the auxiliary combustion gas apparatus 50 is fed into the heat exchanger HEX1 for exhaust heat recovery.

Then, in step 200, when the exhaust gas temperature is equal to or greater than 200° C., the gas turbine MT is considered to be in operation, and in step 202 the auxiliary combustion apparatus 50 is stopped, the three-way selector valve V0 is opened on the heat exchanger HEX1 for exhaust heat recovery side, and the exhaust gas from the gas turbine MT is fed into the heat exchanger HEX1 for exhaust heat recovery. Then, in step 203, the state of each part of the exhaust heat recovery system becomes: control valve V1, proportional control; three-way selector valve V2, feeding heating medium into the heat exchanger HEX1 for exhaust heat recovery; electromagnetic valve V3, open; and pump P1, operating. Subsequently, the control process of the exhaust heat recovery system is executed.

In the exhaust heat recovery system control process, steps identical to those of the first embodiment described above are executed. Specifically, first, in step 210, when the temperature of the heating medium after exhaust heat recovery reaches a desired set temperature, for example, 90° C., based on the detected results of the temperature sensor TC2, the control valve V1 is proportionally controlled. The proportional control of this control valve V1 is continuous while the temperature of the heating medium is lower than 98° C. based on the detected results of the temperature sensor TC2.

In addition, in step 211, when the temperature of the heating medium is equal to or greater than 98° C. based on the detected results of the temperature sensor TC2, the process proceeds to step 212, the control valve V1 switches to diverting the exhaust gas or the combustion gas, and the three-way selector valve V2 switches to diverting the heating medium. When it has been confirmed in step 213 that the temperature of the heating medium has been maintained equal to or above 100° C. for two or more minutes, in step 214, the state of each of the parts of the exhaust heat recovery system is switched to the same conditions as the initial conditions, and in step 215, a warning that "the operation of control valve V1 is faulty/heat recovery halted" is issued.

Then, in step 213, in the case that the temperature of the heating medium has been maintained in a state equal to or greater than 100° C. for two or more minutes, in step 216, it is determined whether or not the temperature of the heating medium is lower than 98° C. If it is lower than 98° C., then in step 217, the control valve V1 switches to proportional control, the three-way selector valve V2 switches to feeding heating medium into the heat exchanger HEX1 for exhaust heat recovery, and the process returns to step 210. In addition, in step 216, when the temperature of the heating medium is higher then 98° C., the process returns to step 212, and step 212 to step 216 are repeated. Moreover, in this exhaust heat recovery system control process, the setting of each of the temperatures and time described above can be arbitrarily changed within a predetermined range.

In this manner, in the exhaust heat recovery system of the present example, while the gas turbine MT (power generator) is stopped, in place of the exhaust gas generated by the gas turbine MT, combustion gas is fed into the heat exchanger HEX1 for exhaust heat recovery, and the heating medium is heated. Thereby, for example, even if the electric generator is stopped during the time that the electricity fees are low, by using this exhaust heat recovery system, it becomes possible to operate predetermined facilities. That is, continuous operation at good cost efficiency is possible.

Moreover, in the exhaust heat recovery system of the present invention, an absorption type chiller (Genelink) that carries out cooling by an absorption type cooling cycle is preferably used as a predetermined facility that circulates and uses the heating medium. As described above, the exhaust heat recovery system of the present invention heats the heating medium to a temperature near the boiling point, and this high temperature state can be stably maintained. Furthermore, it is possible to be continuously operated at good cost efficiency. Thus, in an absorption type cooling device, by circulating and using the heating medium from the exhaust heat recovery system of the present invention, it becomes possible to greatly reduce fuel costs, and at the same time, it becomes possible to improve the overall use efficiency of the heat energy.

Above, suitable embodiments of the present invention were explained with reference to the figures, but of course the present invention is not limited by these examples. The shapes, arrangements, and the like of each of the structural members shown in the examples described above are examples, and various modifications based on design requirements and the like can be made within a scope that does not depart from the spirit of the present invention.

INDUSTRIAL APPLICABILITY

In the exhaust heat recovery system according to the present invention, by having an open-air type tank, heating medium is heated to a high temperature, and the high temperature state can be stably maintained. Therefore, cost reduction and improvement in energy efficiency can be attained.

What is claimed is:

1. An exhaust heat recovery system comprising: a heating medium; a heat exchanger for exhaust heat recovery that a heats said heating medium by carrying out heat exchange between an exhaust gas generated by an electrical power generator and said heating medium that is circulated a tank that temporarily stores said heating medium and an open-air pipe that releases contents of said tank wherein a condenser that condenses steam of said heating medium that is evaporated from said tank is provided on said open-air pipe; and said condenser is disposed so that a flow path on an atmosphere side is higher than a flow path on said tank side.

2. An exhaust heat recovery system according to claim 1, wherein said tank is disposed lower than said heat exchanger for exhaust heat recovery.

3. An exhaust heat recovery system according to claim 1, wherein one end of said open-air pipe is connected to said tank, and the other end is connected to a flow path of said exhaust gas.

4. An exhaust heat recovery system according to claim 1, further comprising a lid including an insulation material, the lid flowing on said heating medium in said tank.

5. An exhaust heat recovery system according to claim 4, wherein a block-preventing part that prevents blocking of said open-air pipe accompanying movement of said lid is provided.

6. An exhaust heat recovery system according to claim 4, wherein an overturn-preventing part which prevents overturn and reverse of said lid is provided at an under face of said lid.

7. An exhaust heat recovery system according to claim 4, wherein a gap is provided between an internal wall of said tank and said lid to limit rough movement of said lid accompanying a steam release of said heating medium.

* * * * *